United States Patent [19]

Crittenden

[11] 4,350,180

[45] Sep. 21, 1982

[54] TENSION CONTROL SYSTEM

[76] Inventor: Odell D. Crittenden, 5700 W. Mercer Way, Mercer Island, Wash. 98040

[21] Appl. No.: 158,287

[22] Filed: Jun. 10, 1980

[51] Int. Cl.$^3$ .................... F16K 31/04; B65H 23/08

[52] U.S. Cl. .................... 137/596.17; 137/613; 226/195

[58] Field of Search .................... 137/596, 596.17, 607, 137/625.21, 613; 271/183; 251/30; 242/75.2; 226/195

[56] References Cited

U.S. PATENT DOCUMENTS

| | | | |
|---|---|---|---|
| 1,043,077 | 11/1912 | Dock | 137/607 |
| 1,051,768 | 1/1913 | Rumold | 137/596 |
| 3,237,644 | 3/1966 | Beck et al. | 137/625.21 |
| 3,698,709 | 10/1972 | Heal et al. | 271/183 |
| 3,704,721 | 12/1972 | Schmitz et al. | 251/30 |
| 3,734,130 | 5/1973 | Hayner et al. | 137/596.1 |

*Primary Examiner*—Alan Cohan

*Assistant Examiner*—John A. Rivell

*Attorney, Agent, or Firm*—Cole, Jensen & Puntigam

[57] ABSTRACT

A vacuum actuated guide and tension control system for use in a corrugated paperboard manufacturing plant or the like. The vacuum actuated guide includes a smooth paper contacting surface having a plurality of spaced openings through which a vacuum is imposed upon a sheet passing thereby. The guide, acting upon paper which is being unwound from a roll, or otherwise being operated upon during movement, urges the paper into frictional pressure contact with the perforated smooth surface. The tension placed upon the paper is controlled automatically by varying the amount of negative pressure to which the paper is subjected. In the event of a paper break or other unexpected happening, the operator can actuate a switch and instantaneously terminate the vacuum enabling an instant shutdown of the machine and correction of the problem.

5 Claims, 4 Drawing Figures

TENSION CONTROL SYSTEM

BACKGROUND OF THE INVENTION

In the past, the feeding and control of liners and webs utilized in the construction of corrugated cardboard or the like has required expensive equipment which has been difficult to adjust and maintain. To assure an acceptable product, the tensioning of the liners must be carefully controlled. Minimal contact with the single face flutes is desired to minimize crushing and assure a uniform product.

SUMMARY OF THE INVENTION

The vacuum operated guide or tension control device utilizing the present invention may well be mounted upon a bridge or used independently along the production line to control tension. The device includes a first assembly for guiding and selectively applying tension to an elongated strip of single face board or web as the single face board or web is drawn through the bridge guide. The single face board comprises an elongated strip of liner bonded to a corrugated medium which in turn defines a sequence of flutes.

Each of the assemblies i.e. guide or tension device includes an elongated box including a bottom in which a plurality of longitudinal slots or openings are formed. The box further includes first and second side walls and first and second end walls which extend upwardly from the bottom. The box is supported in a fixed position along the path of the paper product and each assembly includes parallel guide rolls to support and guide the paper product adjacent the first and second side walls.

A cover is provided for each box including an opening in communication with the interior of the box utilized by the valve assembly controlling the tension. A valve assembly is mounted upon the cover and controls the amount of vacuum generated within the box by controlling access of the ambient air. An operator controlled motor is secured to butterfly type valves within the valve assembly which control the airflow within the vacuum line and in the exhaust port. The butterfly valves are mounted at right angles to each other such that when one of the valves is completely open, the other is completely closed and an infinite adjustment is available therebetween. Obviously, the operator through controlled rotation of the motor can control the amount of vacuum applied to the box by adjusting the valve and controlling the flow of the exhaust and exposure to vacuum.

The valve assembly further includes an immediately actuatable separate butterfly valve in the vacuum system such that in the event of an emergency, the operator need only actuate a single button and a ram controlled butterfly valve is immediately closed within the vacuum supply line allowing the guide to assume ambient pressure.

It is an object of the present invention to provide a control valve for a vacuum tension device which permits the operator to have infinite control over the amount of the tension applied to paper passing by the tension guide and further permits instantaneous termination of the vacuum within the guide.

It is another object of the present invention to provide a control valve for a tension device which is simple of construction, rapid to use and quickly resettable.

Still a further object of the present invention is to provide a valve which provides an operator with immediate control over the tension within a vacuum operated tension device.

DETAILED DESCRIPTION OF THE DRAWINGS

Figure 1:
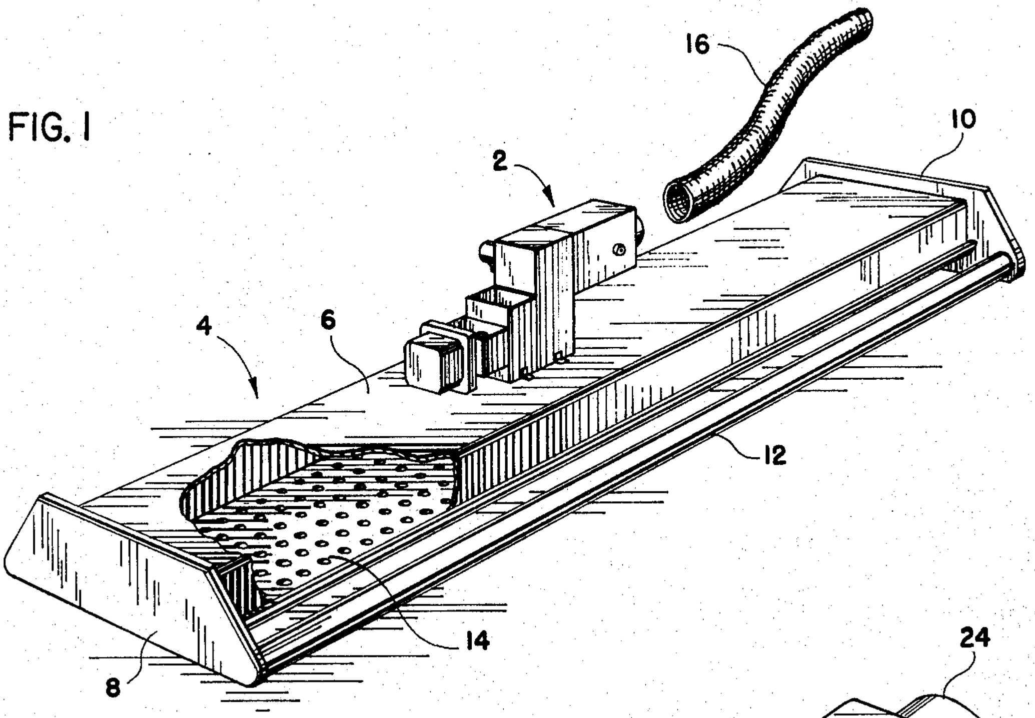
FIG. 1 is a perspective view of a negative pressure or vacuum unit for controlling the tension upon a sheet of paper flowing thereby.

As seen in FIG. 1, the valve which is the subject matter of the present invention, is mounted upon a vacuum bridge guide or tension controller generally designated as 4, which includes an upper shell or cover portion 6 which is U-shaped in vertical section, closed upon the ends by end plates 8 and 10, which include outwardly extending ear portions which support a roller or guide 12 parallel to and located on either side of the vacuum box itself. The open bottom portion of the U-shaped shell or cover is closed by a perforated bottom plate 14 which as explained hereinafter, permits exposure to the vacuum through the entire length of the vacuum box or throughout whatever portion is desired. The width of the vacuum used can be dependent upon the width of the paper stock and may be controlled by movable dams. Although it is to be understood that the vacuum box itself is not an integral portion of the present invention, the operation thereof is necessary for a complete understanding. The upper shell portion 6 includes an opening (not shown) over which the valve assembly 2 is mounted. A negative pressure or vacuum supply hose 16 is attached to the valve assembly 2 and the negative pressure conducted by the hose 16 is selectively transmitted into the vacuum box and when desired, creates a negative pressure through the perforations in the plate 14. It is to be understood that the perforations can be of any convenient configuration although illustrated as round.

A sheet of paper i.e. single face board or single face web upon which work is being done passes over the roller 12, under the plate 14 and over another roller (not shown) on the other side. By adjusting the amount of vacuum or negative pressure within the vacuum box 4, the movement of the paper by the vacuum box is controlled and tension is placed upon the sheet such that operation thereupon is controlled. The particular utilization of this device is further explained in the introductory portion of this document.

Figure 2:
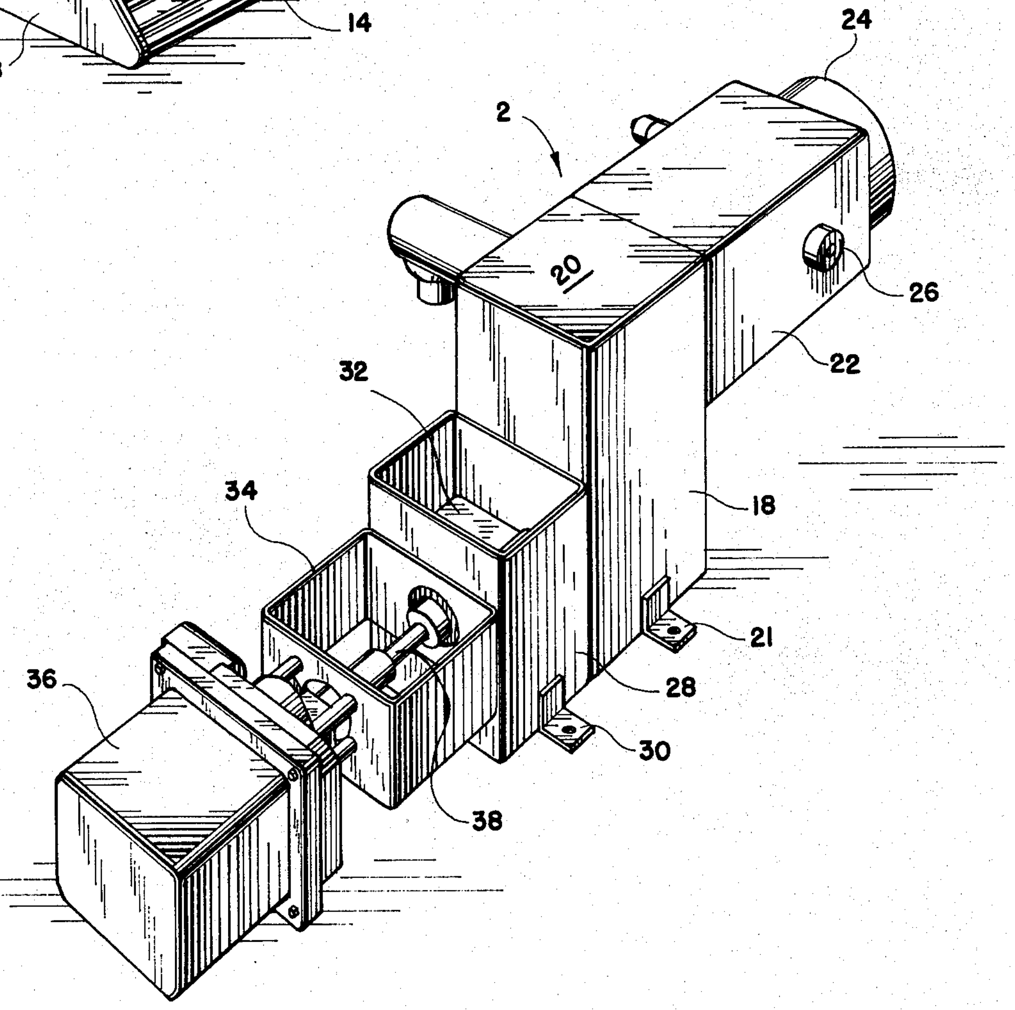
FIG. 2 is a perspective view of the control valve assembly for the tension unit shown in FIG. 1.

Referring now in particular to FIG. 2, the valve assembly 2 is shown in a larger scale and, as can be seen in this view, there is an elongated rectangular shell 18 having a closed upper portion 20 mounted along a vertical axis by means of mounting tabs 21 or any other convenient attachment to the vacuum box. Sealingly secured to the rectangular element 18 is another rectangular element 22 on a horizontal axis and as explained hereinafter, is in fluid communication therewith. An outwardly extending flange 24 is mounted to the closed end portion of the element 22 to permit the attachment of the vacuum hose 16 (not shown). Extending through the rectangular box 22 is a shaft or axle 26 as explained in greater detail hereinafter. Mounted adjacent to the vertical rectangular box 18 is a rectangular open ended tube 28 having attachments 30 for securement for the vacuum box. As seen, the tube 28 is open at the top and as explained hereinafter, includes a valve element 32. Secured adjacent the tube 28 is a second rectangular tube 34 which serves as a spacer and a mount for the motor 36. Motor 36 which is of a controlled revolution type has secured thereto a shaft 38 which extends through the tube 34 and into tube 32 and chamber 18 as explained hereinafter.

Figure 3:
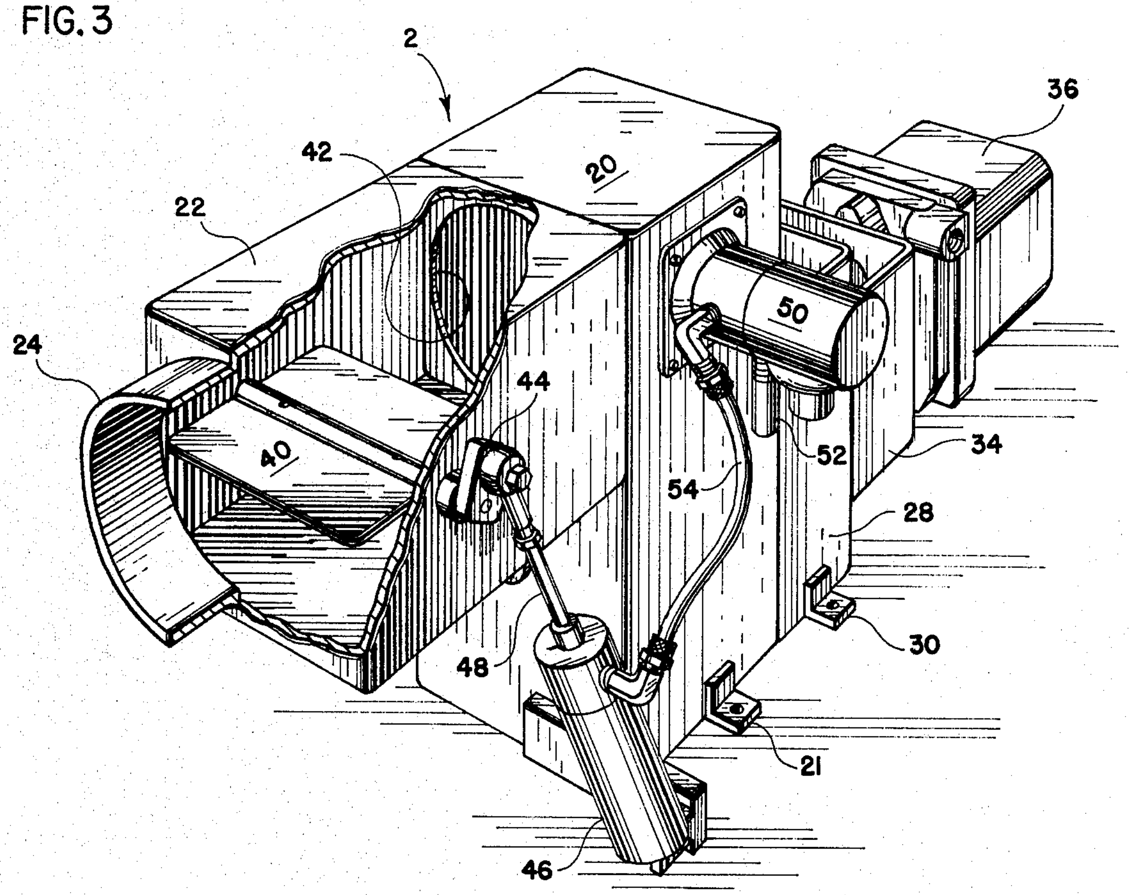
FIG. 3 is a perspective view of the control valve assembly of FIG. 2 taken from the opposite side of the control valve assembly with portions broken away for clarity.

Referring now to FIG. 3, the valve assembly is seen from the opposite end and the various elements are identified by identical numbers. As seen in this view, the chamber formed in the interior of the rectangular box 22 has mounted therein a butterfly valve 40 mounted upon a shaft extending through opposite sides thereof such that when the valve is in its vertical position, it essentially closes the passage from the flange 24 upon which is mounted the vacuum hose 16 and the opening 42 which communicates with the rectangular member 18. The shaft upon which the butterfly valve 40 is mounted extends outwardly through the exterior of the box 22 and has a crank 44 rigidly mounted thereon. Mounted to the lower portion of the housing 18 is a ram 46 having an outwardly extending rod 48 interconnected with crank 44. Operation of the ram 46 closes or opens the butterfly valve 40 selectively terminating the negative pressure to the vacuum box 4. The operation of the ram 46 is controlled by electronic valve 50 which controls the flow of fluid from the intake conduit 52 to the conduit 54 which is interconnected between the valve 50 and the ram 46. In a situation wherein the operator wants to terminate the vacuum instantaneously, he actuates an electric switch at the operational panel which in turn activates the valve 50 and immediately closes butterfly valve 40.

Figure 4:
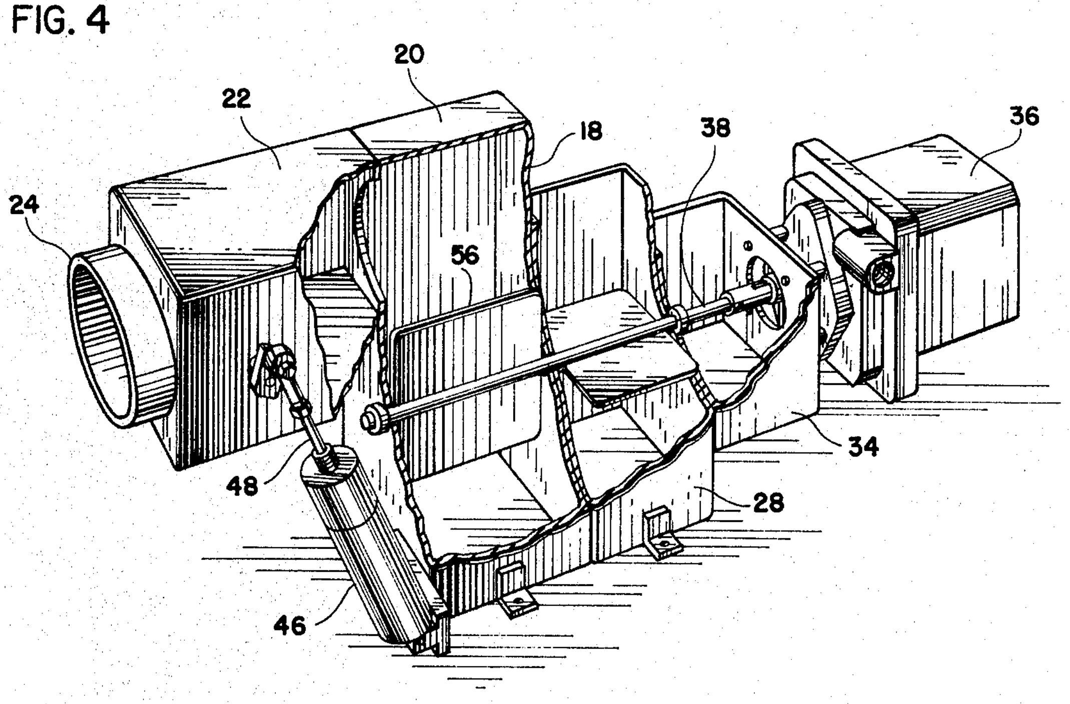
FIG. 4 is another perspective view of the valve assembly of FIG. 2 from a slightly different angle of that of FIG. 3 with different portions broken away for clarity.

In normal operation, the operator will want to adjust the tension upon the paper and thus will want to control the vacuum within the vacuum box. The present invention allows accurate control of the vacuum pressure by means of the motor 36 which includes a 16 second actuator thus permitting close control of the rotation of shaft 38. As seen in FIG. 4, the shaft 38 extends through the tubes 28 and 34 terminating at the outer edge of rectangular container 18. Mounted to shaft 38 are butterfly valves 32 and 56 mounted at right angles or normal to each other such that if valve 32 is closed, valve 56 is open and vice versa. As will be obvious, actuation of motor 36 will vary the relative positions of butterfly valve 32 and 56 to the opposite i.e. 56 closed and 32 completely open. As will be obvious since the rectangular box 18 is in communication with the vacuum hose 16 by means of box 22 and the tube 28 is open to the atmosphere at the upper portion and to the vacuum box 2 as lower portion, as is the box 18. The amount of vacuum within the box 2 is controlled by the amount of atmospheric pressure admitted by movement of the butterfly valves 32, 56.

In operation, depending upon the atmospheric conditions i.e. humidity and the like, the operator can adjust the tension upon the paper passing beneath the vacuum box to assure that the proper tension is available at all times. The tension is controlled by the amount of vacuum, in the general range of 0 to 19 inch of $H_2O$. If the tension is not precise, then the motor 36 will be actuated and the valves adjusted accordingly. In the event of a paper break or other problem, the operator may immediately release the vacuum by actuating the ram 46 and closing butterfly valve 40 thus terminating the vacuum instantaneously.

As thus can be seen, the valve of the present invention allows very close control of the amount of vacuum in the vacuum box and yet allows instantaneously removal of the vacuum.

What is claimed is:

1. A control valve for a web tensioning device used in a paper making machine or the like, said control valve including means to infinitely adjust fluid flow therethrough, such that a flexible sheet may be kept under a constant predetermined tension comprising:

- a main housing defining two separate chambers, the first chamber interconnected with a source of negative pressure, open at its lower portion and interconnected with an exterior distributing third chamber, the second chamber open at its lower portion for interconnection to the distributing third chamber and also open to the atmosphere;
- a shaft extending through the two chambers of the main housing, said shaft having mounted thereon a pair of butterfly valves, one in each chamber, said butterfly valves being interrelated such that they will close one chamber while opening the other or will partially open both chambers;
- a third butterfly valve mounted in the first chamber;
- means for accurately positioning the pair of butterfly valves to control the amount of fluid flow to the third distributing chamber, and
- means for rapidly closing the third butterfly valve whereby in an emergency the negative pressure may be immediately terminated.

2. A control device for use with a machine requiring a constant flow of air at a critical pressure different from that of the atmosphere wherein the flow is transmitted from a general source by means of a conduit, said device comprising:

- means to provide a constant flow of air;
- conduit means interconnecting the control device and the source of airflow;
- a first chamber in communication with an opening in the machine and with the conduit;
- a second chamber in connection with the same opening in the machine and with the atmosphere;
- butterfly valve means in each of the first and the second chambers, said butterfly valve means mounted to a single control shaft normal to each other such that when one is completely open, the other is completely closed, and said valves are infinitely adjustable to control the fluid flow;
- means for adjusting the valve positions to control the flow; and
- means to instantly terminate the flow of air whereby the machine may be immediately shut down.

3. A control device as in claim 2, wherein the means for adjusting the butterfly valve means comprises a controlled revolution motor.

4. A control device in claim 2, wherein the means for instantly terminating the airflow comprises a third butterfly valve within the first chamber operated by a solenoid controlled pneumatic ram.

5. A control device as in claim 2, wherein the first and second chambers are essentially vertically disposed, adjacent to each other, the airflow is from the machine and the means to instantly terminate the flow is upstream of the first chamber.

* * * * *